United States Patent
Gelvin et al.

(10) Patent No.: US 12,509,696 B2
(45) Date of Patent: Dec. 30, 2025

(54) METHODS AND COMPOSITION FOR TRANSFERRING T-DNA INTO A PLANT

(71) Applicant: Purdue Research Foundation, West Lafayetter, IN (US)

(72) Inventors: Stanton B Gelvin, West Lafayette, IN (US); Lan-Ying Lee, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/494,977

(22) Filed: Oct. 6, 2021

(65) Prior Publication Data

US 2022/0112510 A1    Apr. 14, 2022

Related U.S. Application Data

(60) Provisional application No. 63/089,567, filed on Oct. 9, 2020.

(51) Int. Cl.
    *C12N 15/82*    (2006.01)
    *C07K 14/195*   (2006.01)
    *C12N 9/22*     (2006.01)
    *C12N 15/11*    (2006.01)
    *C12N 15/74*    (2006.01)

(52) U.S. Cl.
    CPC ........ *C12N 15/8205* (2013.01); *C07K 14/195* (2013.01); *C12N 9/22* (2013.01); *C12N 15/111* (2013.01); *C12N 15/743* (2013.01); *C12N 15/8213* (2013.01); *C12N 2310/20* (2017.05)

(58) Field of Classification Search
    None
    See application file for complete search history.

(56) References Cited

PUBLICATIONS

Shurvinton et al, A nuclear localization signal and the C-terminal omega sequence in the Agrobacterium tumefaciens VirD2 endonuclease are important for tumor formation, 1992, Proceedings of the National Academy of Sciences 89: 11837-11841 (Year: 1992).*
Narasimhulu et al, Early Transcription of Agrobacterium T-DNA Genes in Tobacco and Maize 1996, The Plant Cell 8: 873-886 (Year: 1996).*
Mysore et al, Role of the Agrobacterium tumefaciens VirD2 Protein in T-DNA Transfer and Integration , 1998, Molecular Plant-Microbe Interactions 11: 668-683 (Year: 1998).*
Vogel et al, Mutational Analysis of Agrobacterium tumefaciens virD2: Tyrosine 29 Is Essential for Endonuclease Activity, 1992, Journal of Bacteriology 174: 303-308 (Year: 1992).*
Gelvin, Agrobacterium-Mediated Plant Transformation: the Biology behind the "Gene-Jockeying" Tool, 2003, Microbiology and Molecular Biology Reviews 67: 16-37. (Year: 2003).*
Lee et al, T-DNA Binary Vectors and Systems, 2008, Plant Physiology 146: 325-332 (Year: 2008).*
Chen et al, A method for the production and expedient screening of CRISPR/Cas9-mediated non-transgenic mutant plants, 2018, Horticultural Research 5(13): 1-12 (Year: 2018).*
Gelvin, Integration of Agrobacterium T-DNA into the Plant Genome, 2017, Annual Review of Genetics 51: 195-217 (Year: 2017).*
Lee et al, CRISPR/Cas9-mediated targeted T-DNA integration in rice, 2019, Plant Molecular Biology 99: 317-328 (Year: 2019).*
Wu et al, AGROBEST: an efficient Agrobacterium-mediated transient expression method for versatile gene function analyses in *Arabidopsis* seedlings, 2014, Plant Methods 10 (19): 1-16. (Year: 2014).*
Shurvinton, C.E., Hodges, L., and Ream, W. (1992). A nuclear localization signal and the C-terminal omega sequence in the Agrobacterium tumefaciens VirD2 endonuclease are important for tumor formation. Proc. Natl. Acad. Sci., USA 89: 11837-11841.
Tenea, G.N., Spantzel, J., Lee, L.-Y., Zhu, Y., Lin, K., Johnson, S.J., and Gelvin, S.B. (2009). Overexpression of several *Arabidopsis* histone genes increases Agrobacterium-mediated transformation and transgene expression in plants. Plant Cell 21: 3350-3367.

* cited by examiner

*Primary Examiner* — Shubo Zhou
*Assistant Examiner* — Aleksandar Radosavljevic
(74) *Attorney, Agent, or Firm* — Reichel Storhy Dean LLP; Natalie J. Dean

(57) ABSTRACT

The present disclosure provides a series of mutant *Agrobacterium* strains generated by random mutagenesis of a widetype or ω mutant VirD2 gene or VirD2 protein. The mutant *Agrobacterium* strains of the present disclosure transiently express T-DNA-encoded transgenes in a target plant but do not stably integrate these genes into the plant genome.

1 Claim, 7 Drawing Sheets

Specification includes a Sequence Listing.

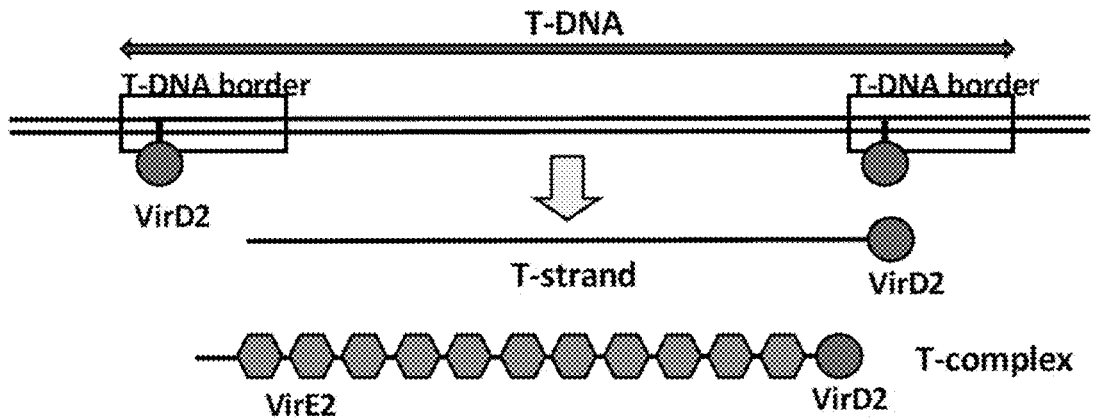
FIG. 1
FIG. 2A
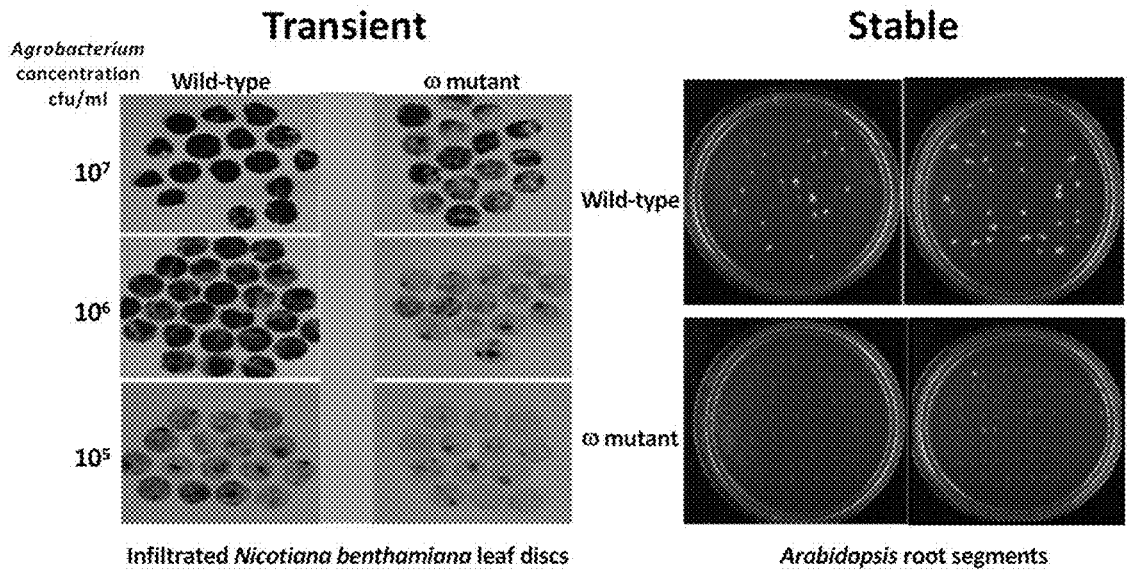
FIG. 2B
FIG. 2C

```
    atg ccc gat cgc gct caa gta atc att cgc att gtg cca gga ggt gga acc aag acc ctt
1    M   P   D   R   A   Q   V   I   I   R   I   V   P   G   G   T   K   T   L    20
    cag cag ata atc aat cag ttg gag tac ctg tcc cgt aag gga aag ctg gaa ctg cag cgt
21   Q   Q   I   I   N   Q   L   E   Y   L   S   R   K   G   K   L   E   L   Q   R  40
    tca gcc cgg cat ctc gat att ccc gtt ccg ccg gat caa atc cgt gag ctt gcc caa agc
41   S   A   R   H   L   D   I   P   V   P   P   D   Q   I   R   E   L   A   Q   S  60
    tgg gtt acg gag gcc ggg att tat gac gaa agt cag tca gac gat gat agg caa caa gac
61   W   V   T   E   A   G   I   Y   D   E   S   Q   S   D   D   D   R   Q   Q   D  80
    tta aca aca cac att att gta agc ttc ccc gca ggt acc gac caa acc gca gct tat gaa
81   L   T   T   H   I   I   V   S   F   P   A   G   T   D   Q   T   A   A   Y   E 100
    gcc agc cgg gaa tgg gca gcc gag atg ttt ggg tca gga tac ggg ggt ggc cgc tat aac
101  A   S   R   E   W   A   A   E   M   F   G   S   G   Y   G   G   G   R   Y   N 120
    tat ctg aca gcc tac cac gtc gac cgc gat cat cca cat tta cat gtc gtg gtc aat cgt
121  Y   L   T   A   Y   H   V   D   R   D   H   P   H   L   H   V   V   V   N   R 140
    cgg gaa ctt ctg ggg cac ggg tgg ctg aaa ata tcc agg cgc cat ccc cag ctg aat tat
141  R   E   L   L   G   H   G   W   L   K   I   S   R   R   H   P   Q   L   N   Y 160
    gac ggc tta cgg aaa aag atg gca gag att tca ctt cgt cac ggc ata gtc ctg gat gcg
161  D   G   L   R   K   K   M   A   E   I   S   L   R   H   G   I   V   L   D   A 180
    act tcg cga gca gaa agg gga ata gca gag cga cca atc aca tat gct gaa cat cgc cgc
181  T   S   R   A   E   R   G   I   A   E   R   P   I   T   Y   A   E   H   R   R 200
    ctt gag cgg atg cag gct caa aag att caa ttc gaa gat aca gat ttt gat gag acc tcg
201  L   E   R   M   Q   A   Q   K   I   Q   F   E   D   T   D   F   D   E   T   S 220
    cct gag gaa gat cgt cgg gac ctc agt caa tcg ttc gat cca ttt cga tcg gac cca tct
221  P   E   E   D   R   R   D   L   S   Q   S   F   D   P   F   R   S   D   P   S 240
    acc ggc gaa ccg gac cgt gca acc cga cat gac aaa caa ccg ctt gaa cag cac gcc cgt
241  T   G   E   P   D   R   A   T   R   H   D   K   Q   P   L   E   Q   H   A   R 260
    ttc cag gag tcc gcc ggc tcc agc atc aaa gcc gac gca aac atc cgc gta tca ttg gag
261  F   Q   E   S   A   G   S   S   I   K   A   D   A   N   I   R   V   S   L   E 280
    agc gag cgg agt gcc caa cca tcc gcg tcc aaa atc cct gta att ggg cat ttc ggg att
281  S   E   R   S   A   Q   P   S   A   S   K   I   P   V   I   G   H   F   G   I 300
    gag act tcc tat gtc gct gaa gcc agc gtg cgc aaa aga agc ggc att ttc ggt act tct
301  E   T   S   Y   V   A   E   A   S   V   R   K   R   G   I   F   G   T   S 320
    cgc ccg gtg act gac gtt gcc atg cac aca gtc aag cgc cag cag cga tca aaa cga cgt
321  R   P   V   T   D   V   A   M   H   T   V   K   R   Q   Q   R   S   K   R   R 340
    aat gac gag gag gca ggt ccg agc gga gca aac cgt aaa gga ttg aag gct gcg caa gtt
341  N   D   E   E   A   G   P   S   G   A   N   R   K   G   L   K   A   A   Q   V 360
    gat tcc gag gca aat gtc ggt gag caa gac act cgc gat gac agc aac aag gcg gct gat
361  D   S   E   A   N   V   G   E   Q   D   T   R   D   D   S   N   K   A   A   D 380
    ccg gtg tct gct tcc atc ggt acc gag caa ccg gaa gct tct cca aag cgt cgg cgt gac
381  P   V   S   A   S   I   G   T   E   Q   P   E   A   S   P   K   R   R   R   D 400
    cgt cac gat gga gaa ttg ggt gga cgc aaa cgt gca aga ggt aat cgt cgc gac gat ggg
401  R   H   D   G   E   L   G   G   R   K   R   A   R   G   N   R   R   D   D   G 420
    cgc ggg ggg acc tag
421  R   G   G   T   *                                                                 424
```

FIG. 4

Altered nucleotide and amino acid sequence

Generation of a stop codon

Tyrosine-29 links VirD2 to T-DNA

Bipartite Nuclear Localization Signal (NLS)

Omega domain

| Strain | -7 | -6 | -5 | -4 | -3 | -2 | -1 | +1 | +2 | +3 | +4 | +5 | +6 | +7 |
|---|---|---|---|---|---|---|---|---|---|---|---|---|---|---|
| Wild-type VirD2 | 0.20 | 0.27 | 2.04 | 1.96 | 2.10 | 0.29 | 1.72 | 0.23 | 0.22 | 0.29 | 0.26 | 0.33 | 0.37 | 0.28 |
| ω mutant VirD2 | 0.34 | 0.47 | 0.53 | 0.46 | 0.52 | 0.51 | 0.59 | 0.54 | 0.42 | 0.36 | 0.40 | 0.47 | 0.59 | 0.37 |
| ωPCR-55 VirD2 | 0.24 | 0.33 | 0.26 | 0.29 | 0.28 | 0.31 | 0.47 | 0.42 | 0.35 | 0.35 | 0.31 | 0.48 | 0.41 | 0.38 |
| 4E-12 VirD2 | 0.37 | 0.43 | 0.52 | 0.55 | 0.54 | 0.44 | 0.74 | 0.85 | 0.33 | 0.31 | 0.36 | 0.38 | 0.53 | 0.33 |
| 31-F6 VirD2 | 0.36 | 0.41 | 0.52 | 0.52 | 0.56 | 0.45 | 0.66 | 0.79 | 0.46 | 0.41 | 0.36 | 0.40 | 0.47 | 0.37 |
| 31-G7 VirD2 | 0.30 | 0.35 | 0.56 | 0.48 | 0.55 | 0.46 | 0.63 | 0.63 | 0.32 | 0.28 | 0.28 | 0.36 | 0.44 | 0.35 |

Nucleotides surrounding the Cas9 cleavage site

FIG. 10

SEQUENCE LISTING

<160> NUMBER OF SEQ ID NOS: 17

<210> SEQ ID NO 1
<211> LENGTH: 35
<212> TYPE: PRT
<213> ORGANISM: Artificial Sequence
<220> FEATURE:
<223> OTHER INFORMATION: Synthetic polypeptide

<400> SEQUENCE: 1

-continued

Arg Gln Glu Gly Pro Asn Asn Gly Lys Trp Ser Val His Asp Thr Leu
1               5                   10                  15

Cys Trp Pro Gly Leu Arg Arg Trp Asp Gly Arg Trp Pro Trp Ser Arg
            20                  25                  30

Ile Arg Leu
        35

<210> SEQ ID NO 2
<211> LENGTH: 16
<212> TYPE: PRT
<213> ORGANISM: Artificial Sequence
<220> FEATURE:
<223> OTHER INFORMATION: Synthetic peptide

<400> SEQUENCE: 2

Asp Val Met Thr Arg Arg Gln Val Arg Ala Glu Gln Thr Val Lys Asp
1               5                   10                  15

<210> SEQ ID NO 3
<211> LENGTH: 68
<212> TYPE: PRT
<213> ORGANISM: Artificial Sequence
<220> FEATURE:
<223> OTHER INFORMATION: Synthetic polypeptide

<400> SEQUENCE: 3

Arg Asp Arg Asp Arg Ile Met Ala Asn Gly Gln Phe Thr Ile Arg Ser
1               5                   10                  15

Ala Gly Pro Ala Ser Val Gly Leu Thr Gly Glu Arg Arg Gly Ala Ala
            20                  25                  30

Ser Ala Ser Ser Ser Ala Ser Ser Asn Ala Cys Gln Pro Pro Gln Gly
        35                  40                  45

Ser Pro Arg Arg Gln Ser Thr Leu Ile Gln Pro Leu Arg Cys Tyr Ser
    50                  55                  60

Ala Val Gly Phe
65

<210> SEQ ID NO 4
<211> LENGTH: 21
<212> TYPE: DNA
<213> ORGANISM: Artificial Sequence
<220> FEATURE:
<223> OTHER INFORMATION: Synthetic primer

<400> SEQUENCE: 4
gaccatgatt acgaatcgag c                                          21

<210> SEQ ID NO 5
<211> LENGTH: 31
<212> TYPE: DNA
<213> ORGANISM: Artificial Sequence
<220> FEATURE:
<223> OTHER INFORMATION: Synthetic primer

<400> SEQUENCE: 5
aatttctaga gggcaccttt caatagcgag c                                31

<210> SEQ ID NO 6
<211> LENGTH: 29
<212> TYPE: DNA
<213> ORGANISM: Artificial Sequence
<220> FEATURE:
<223> OTHER INFORMATION: Synthetic primer -continued

```
<400> SEQUENCE: 6
aatttctaga cttgaccacg cacctgacg                                29

<210> SEQ ID NO 7
<211> LENGTH: 22
<212> TYPE: DNA
<213> ORGANISM: Artificial Sequence
<220> FEATURE:
<223> OTHER INFORMATION: Synthetic primer

<400> SEQUENCE: 7
atacgcggat ccgtgcgtcg gc                                       22

<210> SEQ ID NO 8
<211> LENGTH: 21
<212> TYPE: DNA
<213> ORGANISM: Artificial Sequence
<220> FEATURE:
<223> OTHER INFORMATION: Synthetic primer

<400> SEQUENCE: 8
ttaagttggg taacgccagg g                                        21

<210> SEQ ID NO 9
<211> LENGTH: 20
<212> TYPE: DNA
<213> ORGANISM: Artificial Sequence
<220> FEATURE:
<223> OTHER INFORMATION: Synthetic primer

<400> SEQUENCE: 9
aacaaccgct tgaacagcac                                          20

<210> SEQ ID NO 10
<211> LENGTH: 29
<212> TYPE: DNA
<213> ORGANISM: Artificial Sequence
<220> FEATURE:
<223> OTHER INFORMATION: Synthetic primer

<400> SEQUENCE: 10
attgcatgca ttggacagtg cagagctag                                29

<210> SEQ ID NO 11
<211> LENGTH: 21
<212> TYPE: DNA
<213> ORGANISM: Artificial Sequence
<220> FEATURE:
<223> OTHER INFORMATION: Synthetic primer

<400> SEQUENCE: 11
gaagtctcaa tcccgaaatg c                                        21

<210> SEQ ID NO 12
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 12
gctgcatgga aagatgatga                                          20

<210> SEQ ID NO 13
<211> LENGTH: 29
```

<212> TYPE: PRT
<213> ORGANISM: Agrobacterium sp.

<400> SEQUENCE: 13

Lys Arg Pro Pro Asp Arg His Asp Gly Glu Leu Gly Gly Arg Lys Arg
1               5                   10                  15

Ala Arg Gly Asn Arg Arg Asp Asp Gly Arg Gly Gly Thr
            20                  25

<210> SEQ ID NO 14
<211> LENGTH: 4
<212> TYPE: PRT
<213> ORGANISM: Artificial Sequence
<220> FEATURE:
<223> OTHER INFORMATION: Synthetic peptide

<400> SEQUENCE: 14

Ser Ser Ser Ser
1

<210> SEQ ID NO 15
<211> LENGTH: 1275
<212> TYPE: DNA
<213> ORGANISM: Agrobacterium sp.

<400> SEQUENCE: 15

```
atgcccgatc gcgctcaagt aatcattcgc attgtgccag gaggtggaac caagaccctt      60
cagcagataa tcaatcagtt ggagtacctg tcccgtaagg gaaagctgga actgcagcgt     120
tcagcccggc atctcgatat tcccgttccg ccggatcaaa tccgtgagct tgcccaaagc     180
tgggttacgg aggccgggat ttatgacgaa agtcagtcag acgatgatag caacaagac      240
ttaacaacac acattattgt aagcttcccc gcaggtaccg accaaaccgc agcttatgaa     300
gccagccggg aatgggcagc cgagatgttt gggtcaggat acggggtgg ccgctataac      360
tatctgacag cctaccacgt cgaccgcgat catccacatt tacatgtcgt ggtcaatcgt     420
cgggaacttc tggggcacgg gtggctgaaa atatccaggc gccatcccca gctgaattat     480
gacggcttac ggaaaaagat ggcagagatt tcacttcgtc acggcatagt cctggatgcg     540
acttcgcgag cagaaagggg aatagcagag cgaccaatca catatgctga acatcgccgc     600
cttgagcgga tgcaggctca aaagattcaa ttcgaagata cagattttga tgagacctcg     660
cctgaggaag atcgtcggga cctcagtcaa tcgttcgatc catttcgatc ggacccatct     720
accggcgaac cggaccgtgc aacccgacat gacaaacaac cgcttgaaca gcacgcccgt     780
ttccaggagt ccgccggctc cagcatcaaa gccgacgcac ggatccgcgt atcattggag     840
agcgagcgga gtgcccaacc atccgcgtcc aaaatccctg taattgggca tttcgggatt     900
gagacttcct atgtcgctga agccagcgtg cgcaaacgaa gcggcatttt cggtacttct     960
cgcccggtga ctgacgttgc catgcacaca gtcaagcgcc agcagcgatc aaaacgacgt    1020
aatgacgagg aggcaggtcc gagcggagca aaccgtaaag gattgaaggc tgcgcaagtt    1080
gattccgagg caaatgtcgg tgagcaagac actcgcgatg acagcaacaa ggcggctgat    1140
ccggtgtctg cttccatcgg taccgagcaa ccggaagctt ctccaaagcg tccgcgtgac    1200
cgtcacgatg gagaattggg tggacgcaaa cgtgcaagag gtaatcgtcg cgacgatggg    1260
cgcgggggga cctag                                                     1275
```

<210> SEQ ID NO 16
<211> LENGTH: 424

```
<212> TYPE: PRT
<213> ORGANISM: Agrobacterium sp.
<220> FEATURE:
<221> NAME/KEY: misc_feature
<223> OTHER INFORMATION: See specification as filed for detailed
      description of substitutions and preferred embodiments

<400> SEQUENCE: 16

Met Pro Asp Arg Ala Gln Val Ile Ile Arg Ile Val Pro Gly Gly Gly
1               5                   10                  15

Thr Lys Thr Leu Gln Gln Ile Ile Asn Gln Leu Glu Tyr Leu Ser Arg
            20                  25                  30

Lys Gly Lys Leu Gln Leu Gln Arg Ser Ala Arg His Leu Asp Ile Pro
        35                  40                  45

Val Pro Pro Asp Gln Ile Arg Glu Leu Ala Gln Ser Trp Val Thr Glu
    50                  55                  60

Ala Gly Ile Tyr Asp Glu Ser Gln Ser Asp Asp Arg Gln Gln Asp
65                  70                  75                  80

Leu Thr Thr His Ile Ile Val Ser Phe Pro Ala Gly Thr Asp Gln Thr
                85                  90                  95

Ala Ala Tyr Glu Ala Ser Arg Glu Trp Ala Ala Glu Met Phe Gly Ser
            100                 105                 110

Gly Tyr Gly Gly Gly Arg Tyr Asn Tyr Leu Thr Ala Tyr His Val Asp
        115                 120                 125

Arg Asp His Pro His Leu His Val Val Asn Arg Arg Glu Leu Leu
130                 135                 140

Gly His Gly Trp Leu Lys Ile Ser Arg Arg His Pro Gln Leu Asn Tyr
145                 150                 155                 160

Asp Gly Leu Arg Lys Lys Met Ala Glu Ile Ser Leu Arg His Gly Ile
                165                 170                 175

Val Leu Asp Ala Thr Ser Arg Ala Glu Arg Gly Ile Ala Glu Arg Pro
            180                 185                 190

Ile Thr Tyr Ala Glu His Arg Arg Leu Glu Arg Met Gln Ala Gln Lys
        195                 200                 205

Ile Gln Phe Glu Asp Thr Asp Phe Asp Glu Thr Ser Pro Glu Glu Asp
    210                 215                 220

Arg Arg Asp Leu Ser Gln Ser Phe Asp Pro Phe Arg Ser Asp Pro Ser
225                 230                 235                 240

Thr Gly Glu Pro Asp Arg Ala Thr Arg His Asp Lys Gln Pro Leu Glu
                245                 250                 255

Gln His Ala Arg Phe Gln Glu Ser Ala Gly Ser Ser Ile Lys Ala Asp
            260                 265                 270

Ala Arg Ile Arg Val Ser Leu Glu Ser Glu Arg Ser Ala Gln Pro Ser
        275                 280                 285

Ala Ser Lys Ile Pro Val Ile Gly His Phe Gly Ile Glu Thr Ser Tyr
    290                 295                 300

Val Ala Glu Ala Ser Val Arg Lys Arg Ser Gly Ile Phe Gly Thr Ser
305                 310                 315                 320

Arg Pro Val Thr Asp Val Ala Met His Thr Val Lys Arg Gln Gln Arg
                325                 330                 335

Ser Lys Arg Arg Asn Asp Glu Glu Ala Gly Phe Ser Gly Ala Asn Arg
            340                 345                 350

Lys Gly Leu Lys Ala Ala Gln Val Asp Ser Glu Ala Asn Val Gly Glu
        355                 360                 365

Gln Asp Thr Arg Asp Asp Ser Asn Lys Ala Ala Asp Pro Val Ser Ala
```

-continued

```
                370                 375                 380
Ser Ile Gly Thr Glu Gln Pro Glu Ala Ser Pro Lys Arg Pro Arg Asp
385                 390                 395                 400

Arg His Asp Gly Glu Leu Gly Gly Arg Lys Arg Ala Arg Gly Asn Arg
                405                 410                 415

Arg Asp Asp Gly Arg Gly Gly Thr
            420

<210> SEQ ID NO 17
<211> LENGTH: 36
<212> TYPE: PRT
<213> ORGANISM: Artificial Sequence
<220> FEATURE:
<223> OTHER INFORMATION: Synthetic Polypeptide

<400> SEQUENCE: 17

Gln Arg Gln Glu Gly Pro Asn Asn Gly Lys Trp Ser Val His Asp Thr
1               5                   10                  15

Leu Cys Trp Pro Gly Leu Arg Arg Thr Asp Gly Arg Thr Pro Trp Ser
            20                  25                  30

Arg Ile Arg Leu
        35
```

METHODS AND COMPOSITION FOR TRANSFERRING T-DNA INTO A PLANT

CROSS-REFERENCE TO RELATED APPLICATIONS

This application claims the benefit of U.S. Provisional Application No. 63/089,567, filed on Oct. 9, 2020, which is incorporated herein by reference in its entirety.

GOVERNMENT SUPPORT CLAUSE

This invention was made with government support under grant IOS1725122 awarded by the National Science Foundation. The government has certain rights in the invention.

SEQUENCE LISTING

The instant application contains a Sequence Listing which has been submitted electronically in ASCII format and is hereby incorporated by reference in its entirety. Said ASCII copy, created Aug. 20, 2025, is named 69237-02 Sequence Listing 20 Aug. 2025 ST25.txt and is 9,886 bytes in size. The information recorded in computer readable form is identical to the written Sequence Listing provided herein, pursuant to 37 C.F.R. § 1.821(f).

FIELD OF INVENTION

The present disclosure relates generally to *Agrobacterium* species for transforming a plant. More particularly, the present disclosure relates to *Agrobacterium* species that transfer T-(transfer) DNA into a plant without integrating the T-DNA to the genome of such plant.

BACKGROUND OF THE INVENTION

*Agrobacterium* species genetically transform plants by transferring a region of a plasmid (Ti-, or tumor inducing, plasmid) to plants. This region is called T-(transfer) DNA. T-DNA is initially processed from the Ti-plasmid by the activity of two proteins, VirD1 and VirD2. These two virulence (Vir) proteins form a complex and nick the T-DNA region of the Ti-plasmid within the T-DNA border repeat regions, which are 25 bp near-identical sequences that flank and delimit the T-DNA region.

During this nicking process, VirD2 protein covalently attaches to the 5' end of the T-DNA strands (T-strands) through a phosphotyrosine linkage. The VirD2/T-strand complex subsequently is peeled off from the Ti-plasmid, forming a complex of VirD2 attached to the single-strand T-strand. It is this complex that is transferred from *Agrobacterium* to plant cells. Once in the plant, the T-strand DNA is thought to be coated by VirE2 protein, another Virulence protein made by *Agrobacterium* and transferred to the plant, to form a T-complex.

VirD2 is thought to be the protein most responsible for targeting T-strands to the plant nucleus. Once inside the nucleus, T-strands (either before or after replication to a double-strand DNA form; the mechanism is still unknown) may be integrated into the plant genome, generating a stably transformed transgenic plant. The role of VirD2 in T-DNA integration into the plant genome is still not clear. However, it is thought that VirD2 does play a role. VirD2 has numerous protein domains, including a tyrosine$^{29}$ through which VirD2 covalently links to T-DNA, an N-terminal relaxase domain, a central domain of unknown function (DUF), a bipartite C-terminal nuclear localization signal (NLS) sequence, and a small conserved domain near the C-terminus of the protein called ω. Alteration of ω by deletion of four amino acids and substitution of four serine residues (the ω mutation) results in an *Agrobacterium* strain that transfers T-DNA ~4-5 fold less efficiently (transient transformation), but which integrates T-DNA ~50-fold less efficiently (stable transformation). Thus the ω mutation results in an *Agrobacterium* strain that partially uncouples T-DNA transfer from T-DNA integration.

Previously, scientists generated genome-edited plants by transferring T-DNA, containing genome editing reagents (such as CRISPR-Cas), and having this T-DNA integrate into the plant genome, creating a transgenic plant. After the genome engineering reagents functioned to create desired mutations, scientists eliminated the plant chromosome containing T-DNA by genetic crossing, generating an edited but non-transgenic organism. However, genetic crossing is often not practical or economically feasible for plants (such as trees) with long generation times, or for plants (such as banana, potato, sweet potato, sugar cane, etc.) that are normally vegetatively propagated. For genome engineering purposes, it would be advantageous to generate an *Agrobacterium* strain that can efficiently transfer T-DNA but not integrate it. That way, one could deliver genome engineering reagents and have these reagents edit the genome, but not integrate T-DNA encoding these reagents. Thus, scientists would not generate a transgenic plant, which is subject to regulation in many countries.

Therefore, there is a need to generate an *Agrobacterium* strain comprising a virD2 mutant that effects efficient transient transformation, and low or no stable transformation.

SUMMARY OF THE INVENTION

The present disclosure provides a series of *Agrobacterium* strains comprising VirD2 mutants that effect efficient transient transformation of a plant. In certain embodiments, the *Agrobacterium* strains of the present disclosure comprise a mutation, including but not limited to nucleotide substitutions, insertions, and deletions.

In certain embodiments, the mutant *Agrobacterium* strain is the 4E12 strain comprising a mutation His$^{402}$Arg, plus replacement of the stop codon with Gln extending the protein with the amino acids: Arg-Gln-Glu-Gly-Pro-Asn-Asn-Gly-Lys-Trp-Ser-Val-His-Asp-Thr-Leu-Cys-Trp-Pro-Gly-Leu-Arg-Arg-Thr-Asp-Gly-Arg-Thr-Pro-Trp-Ser-Arg-Ile-Arg-Leu (SEQ ID NO: 1).

In other embodiments, the mutant *Agrobacterium* strains are ExD3, containing Leu$^{122}$Gln and Ile$^9$Val; 1B10 containing Glu$^{64}$Gly; 4G10 containing Lys$^{338}$Asn and a frameshift after the stop codon extending the protein with the sixteen (16) amino acids: Asp-Val-Met-Thr-Arg-Arg-Gln-Val-Arg-Ala-Glu-Gln-Thr-Val-Lys-Asp (SEQ ID NO: 2); 1G03, with Trp$^{148}$stop codon; 21G2 with His$^{155}$Tyr and Lys$^{166}$Glu.

In still other embodiments, mutations were built into an omega (ο) mutant VirD2, which itself already has the mutations Asp$^{418}$Ser, Asp$^{419}$Ser, Gly$^{420}$Ser, and Arg$^{421}$Ser. These additional mutations include: 31V1-1/-2 with Lys$^{332}$Met; 31C3 with Gly$^{367}$Asp; 32C9 with Ser$^{278}$Pro; 31C10 with Asn$^{376}$Asp and Asn$^{341}$Ser; 31C11 with Lys$^{332}$Glu; 31G7 with Ser$^{320}$Pro; 36B1 with Asn$^{415}$Ser; 36B9-1 with Leu$^{279}$Trp; 21F5 with Leu$^{38}$Arg; 311B7 with Val$^{331}$Ala; 31E7 with Asp$^{361}$Asn and Arg$^{413}$Ser; 32A2 with Thr$^{30}$Ala and Asp$^{380}$Gly; 34A9 with Arg$^{339}$Cys; 34E11 with Trp$^{219}$Ala and Arg$^{183}$Gln; 36A9 with Val$^{305}$Ala; 36D10 with Pro$^{322}$Leu; ωPCR-2 with Ser$^{280}$Asn; ωPCR-76 with Ala$^{379}$Val and Asp$^{380}$His; ωPCR-77 with Ser$^{394}$Pro; ωPCR-78 with Ile$^{30}$Ser; ωPCR-80 with Asn$^{365}$Lys; ωPCR-84 with Thr$^{302}$Ala; ωPCR-87 with Ile$^{292}$Val; ωPCR-93 with Thr$^{424}$Pro and missing C3$^{62}$ causing a frameshift and extending the protein with the amino acids: Arg-Asp-Arg-Asp-Arg-Ile-Met-Ala-Asn-Gly-Gln-Phe-Thr-Ile-Arg-Ser-Ala-Gly-Pro-Ala-Ser-Val-Gly-Leu-Thr-Gly-Glu-Arg-Arg-Gly-Ala-Ala-Ser-Ala-Ser-Ser-Ser-Ala-Ser-Ser-Asn-Ala-Cys-Gln-Pro-Pro-Gln-Gly-Ser-Pro-Arg-Asp-Gln-Ser-Thr-Leu-Ile- Gln-Pro-Leu-Arg-Cys-Tyr-Ser-Ala-Val-Gly-Phe (SEQ ID NO: 3); ωPCR-127 with Arg$^{276}$His and Arg$^{411}$His; ωPCR-11 with Ala$^{358}$Ser; ωPCR-20 with Asn$^{351}$Ser; ωPCR-16 with Lys$^{353}$Glu; ωPCR-25 with Val$^{277}$Ala; ωPCR-39 with Thr$^{388}$Ser; ωPCR-45 with Ser$^{362}$Pro; and ωPCR-55 with Lys$^{338}$Glu.

The present disclosure further provides that the mutant *Agrobacterium* strains effect at least 5 to 50-fold less or no stable transformation relative to the corresponding wild-type *Agrobacterium* strain. In certain embodiments, the mutant *Agrobacterium* strains show high transient GUS activity on infiltrated tobacco leaves and no or very low stable transformation of *Kalanchoe* and *Arabidopsis*.

A method of making the mutant *Agrobacterium* strains of the present disclosure is also provided. The method comprises a step of making a mutant *Agrobacterium* strain comprising a non-polar deletion of a portion of a VirD2 gene (ΔVirD2). The present disclosure provides that this deletion mutation of VirD2 is non-polar in that it does not affect expression of the downstream genes VirD3, VirD4, and VirD5. In certain embodiments, the invention includes cloning the VirD$_{promoter}$VirD1-mVirD2 genes onto a plasmid (mVirD2 is a mutant VirD2). The method of making the mutant *Agrobacterium* strains further comprises steps of conducting PCR-based random mutagenesis of the VirD2 gene and sequencing various mutants to determine where mutations have occurred, and then introducing the plasmid containing the VirD$_{promoter}$-VirD1-mutant virD2 genes into a non-polar virD2 mutant *Agrobacterium* strain, along with appropriate T-DNA binary vectors to monitor transient and stable transformation. In certain embodiments, the T-DNA comprises a Cas9 gene, a sgRNA gene, and a Venus-intron gene, and VirD2 mutants support editing around the Cas9 cleavage site at at least 25-40% the frequency of the wild-type VirD2 gene.

A method of use the mutant *Agrobacterium* strains of the present disclosure is also provided. The present disclosure provides that the mutant *Agrobacterium* strains of the present disclosure can be used for genome editing, such as CRISPR/Cas genome editing, in any plant species. In certain embodiments, the mutant *Agrobacterium* strains are able to edit the genome of *Nicotiana benthamiana*, resulting in mutations of the PDS1 and PDS2 genes. In other embodiments, the mutant *Agrobacterium* strains can be used for directed alteration of a nucleotide sequence by homology-dependent repair (HDR).

BRIEF DESCRIPTION OF THE DRAWINGS

FIG. 1. Schematic diagram of the generation of VirD2/T-strand complexes in *Agrobacterium*. VirD2 nicks the T-DNA region of the Ti-plasmid within the border repeat sequences. VirD2 covalently links to the T-strand, forming a VirD2/T-strand complex. After transport to the plant cell, the single-strand T-strands are thought to be coated by VirE2 protein, which is also transported from *Agrobacterium* into the plant cell.

FIGS. 2A-2C. Role of the VirD2 ω region in transient and stable transformation. FIG. 2A: Schematic diagram of the VirD2 protein, showing the various domains. *NLS, sequence that likely does not have NLS activity in vivo. Note the amino acid sequence in the C-terminus of the protein, including the active NLS and the ω domain. The amino acid sequence of wild-type and mutant ω domains are shown in black and gray, respectively. FIG. 2A discloses SEQ ID NOS 13 and 14, respectively, in order of appearance. FIG. 2B: Transient transformation of tobacco leaf discs by an *Agrobacterium* strain containing wild-type or ω mutant VirD2 proteins. Note that a strain with the ω mutation shows ~5-fold less transient transformation (GUS activity) than does a strain with a wild-type VirD2. FIG. 2C. Stable transformation of *Arabidopsis* root segments by an *Agrobacterium* strain containing wild-type or ω mutant VirD2 proteins. Note that a strain with the ω mutation shows ~50-fold less stable transformation (crown gall tumorigenesis) than does a strain with a wild-type VirD2.

FIG. 4. Nucleotide and amino acid sequence of the VirD2 protein. The wild-type sequence is shown; note that only the wild-type nucleotides and amino acids are shown. The positions of mutations are shown in gray. Various protein domains are highlighted. Note that the mutations are randomly distributed throughout the nucleotide/amino acid sequence. FIG. 4 discloses SEQ ID NOS 15 and 16, respectively, in order of appearance.

The roots were then moved to CIM medium containing timentin (to kill *Agrobacterium*) and kanamycin (to select for stable transformants). Kanamycin-resistant calli were scored after one month.

Figure 9:
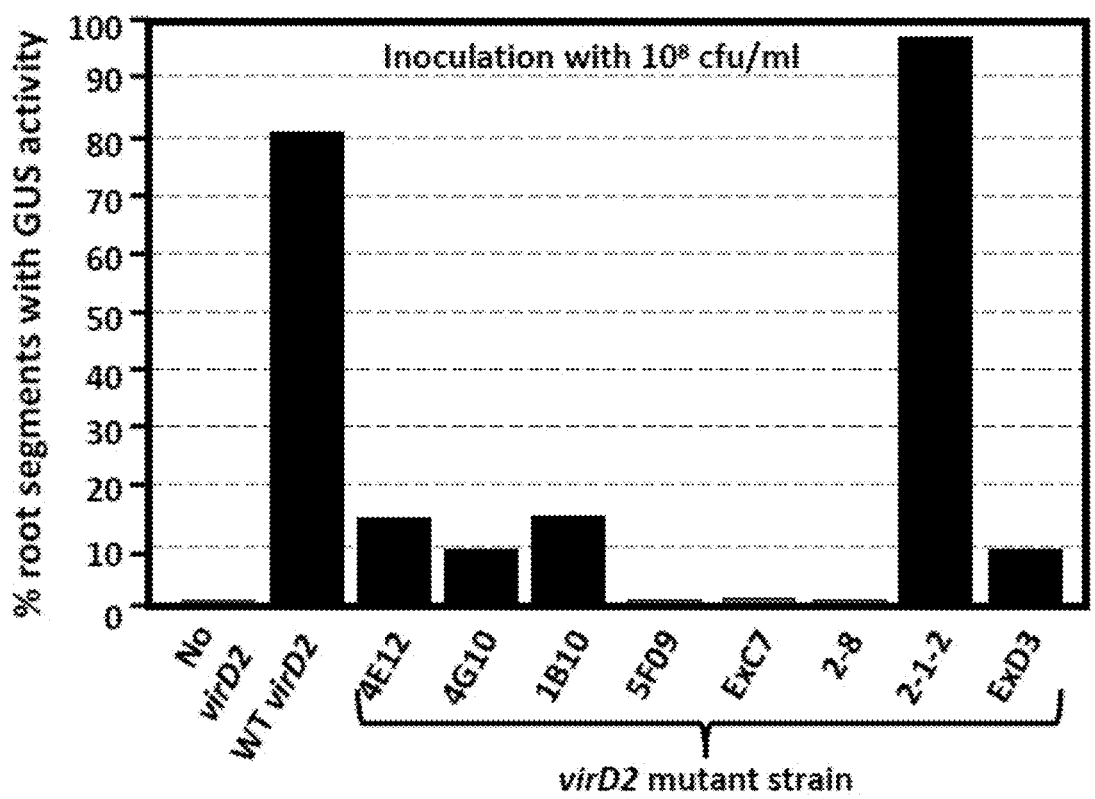

FIG. 9. Quantitative transient transformation assay of *Arabidopsis* root segments infected with *Agrobacterium* strains harboring various mutant virD2 genes. Root segments from wild-type (ecotype Col-0) plants were infected with the various *Agrobacterium* strains at $10^8$ cfu/ml for two days. The roots were then moved to CIM medium containing timentin (to kill *Agrobacterium*) and incubated for one month. Root segments were then stained with X-gluc for GUS activity. Note that mutant 4E12, which effects extremely low stable transformation activity, effects substantial transient transformation GUS activity.

FIG. 10. Mutation frequencies surrounding the Cas9 cleavage site in the *Nicotiana benthamiana* PDS2 gene. *N. benthamiana* leaves were infiltrated with an *Agrobacterium* strain containing a wild-type or mutant VirD2 gene. The T-DNA contained a Cas9 gene, a sgRNA gene directed against the tobacco PDS2 gene, and a Venus-intron gene. DNA was extracted from Venus-fluorescent tissue and a region surrounding the PDS2 cleavage site was amplified by PCR. The amplicons were sequenced via Wide-seq. Shown are the percentage of mutations at each site surrounding the Cas9 cleavage site. The number of reads (sequencing depth) at each nucleotide varied from ~7000-27000. The percent mutations includes nucleotide substitutions, insertions, and deletions (most mutations are in/dels). Shown are the nucleotides surrounding the Cas9 cleavage site. The PAM (protospacer adjacent motif) sequence is also shown. All these VirD2 mutants show good transient GUS activity on infiltrated tobacco leaves, and extremely poor stable transformation of *Kalanchoe* and *Arabidopsis*. Note that these VirD2 mutants support editing around the Cas9 cleavage site at ~25-40% the frequency of the wild-type VirD2 gene.

DETAILED DESCRIPTION OF THE INVENTION

The present disclosure provides a series of *Agrobacterium* strains comprising VirD2 mutants, including but not limited to, nucleotide substitutions, insertions, and deletions, that effect efficient transient, but at least 5-50 folds less stable transformation and/or no stable transformation of a plant.

In certain embodiments, the mutant *Agrobacterium* strain is the 4E12 strain comprising a mutation $His^{402}Arg$, plus replacement of the stop codon with Gln extending the protein with the amino acids: Arg-Gln-Glu-Gly-Pro-Asn-Asn-Gly-Lys-Trp-Ser-Val-His-Asp-Thr-Leu-Cys-Trp-Pro-Gly-Leu-Arg-Arg-Thr-Asp-Gly-Arg-Thr-Pro-Trp-Ser-Arg-Ile-Arg-Leu (SEQ ID NO: 1).

In other embodiments, the mutant *Agrobacterium* strains are ExD3, containing $Leu^{122}Gln$ and $Ile^9Val$; 1B10 containing $Glu^{64}Gly$; 4G10 containing $Lys^{338}Asn$ and a frameshift after the stop codon expending the protein with sixteen (16) amino acids: Asp-Val-Met-Thr-Arg-Arg-Gln-Val-Arg-Ala-Glu-Gln-Thr-Val-Lys-Asp (SEQ ID NO: 2); 1G03, with $Trp^{148}$stop codon; 21G2 with $His^{155}Tyr$ and $Lys^{166}Glu$; 1 G03, with $Trp^{148}$stop codon; 21 G2 with $His^{155}Tyr$ and $Lys^{166}Glu$.

In still other embodiments, mutations were built into an omega (ω) mutant VirD2, which itself already has the mutations $Asp^{418}Ser$, $Asp^{419}Ser$, $Gly^{420}Ser$, and $Arg^{421}Ser$. These additional mutations include: 31V1-1/-2 with $Lys^{332}Met$; 31C3 with $Gly^{367}Asp$; 32C9 with $Ser^{278}Pro$; 31C10 with $Asn^{376}Asp$ and $Asn^{341}Ser$; 31C11 with $Lys^{332}Glu$; 31G7 with $Ser^{320}Pro$; 36B1 with $Asn^{415}Ser$; 36B9-1 with $Leu^{279}Trp$; 21F5 with $Leu^{38}Arg$; 311B7 with $Val^{331}Ala$; 31E7 with $Asp^{361}Asn$ and $Arg^{413}Ser$; 32A2 with $Thr^{30}Ala$ and $Asp^{380}Gly$; 34A9 with $Arg^{339}Cys$; 34E11 with $Trp^{219}Ala$ and $Arg^{183}Gln$; 36A9 with $Val^{305}Ala$; 36D10 with $Pro^{322}Leu$; ωPCR-2 with $Ser^{280}Asn$; ωPCR-76 with $Ala^{379}Val$ and $Asp^{380}His$; ωPCR-77 with $Ser^{394}Pro$; ωPCR-78 with $Ile^{30}Ser$; ωPCR-80 with $Asn^{365}Lys$; ωPCR-84 with $Thr^{302}Ala$; ωPCR-87 with $Ile^{292}Val$; ωPCR-93 with $Thr^{424}Pro$ and missing $C3^{62}$ causing a frameshift and extending the protein with the amino acids: Arg-Asp-Arg-Asp-Arg-Ile-Met-Ala-Asn-Gly-Gln-Phe-Thr-Ile-Arg-Ser-Ala-Gly-Pro-Ala-Ser-Val-Gly-Leu-Thr-Gly-Glu-Arg-Arg-Gly-Ala-Ala-Ser-Ala-Ser-Ser-Ser-Ala-Ser-Ser-Asn-Ala-Cys-Gln-Pro-Pro-Gln-Gly-Ser-Pro-Arg-Asp-G ln-Ser-Thr-Leu-Ile-Gln-Pro-Leu-Arg-Cys-Tyr-Ser-Ala-Val-Gly-Phe (SEQ ID NO: 3); ωPCR-127 with $Arg^{276}His$ and $Arg^{411}His$; ωPCR-11 with $Ala^{358}Ser$; ωPCR-20 with $Asn^{351}Ser$; ωPCR-16 with $Lys^{353}Glu$; ωPCR-25 with $Val^{277}Ala$; ωPCR-39 with $Thr^{388}Ser$; ωPCR-45 with $Ser^{362}Pro$; and ωPCR-55 with $Lys^{338}Glu$.

In certain embodiments, the mutant *Agrobacterium* strains show transient GUS activity on infiltrated tobacco leaves and no or extremely low stable transformation of *Kalanchoe* and *Arabidopsis*.

A method of making and using the mutant *Agrobacterium* strains of the present disclosure are also provided herein. The present disclosure provides that the mutant *Agrobacterium* strains can be used for gene editing in any plant species. In certain embodiments, the mutant *Agrobacterium* strains are used CRISPR/Cas genome editing, and the VirD2 mutant of the mutant *Agrobacterium* strains support around the Cas9 cleavage site at at least 25-40% the frequency of the wide-type VirD2 gene. The present disclosure further provides that the mutant *Agrobacterium* strains can be used for altering, in a directed way, any particular nucleotide sequence through "homology-dependent repair (HDR)."

The following description of the embodiments is merely exemplary in nature and is in no way intended to limit the present disclosure, its application, or uses. Although specific terms are employed herein, they are used in a generic and descriptive sense only and not for purposes of limitation.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing certain aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a short chain fatty acid," "a carnitine derivative," or "an adjuvant," includes, but is not limited to, combinations of two or more such short chain fatty acids, carnitine derivatives, or adjuvants, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

It should be emphasized that the following disclosures are put forth so as to provide those of ordinary skill in the art with a complete disclosure and description of how the composition of matter, e.g., the mutant strains in this disclosure, and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Figure 3:
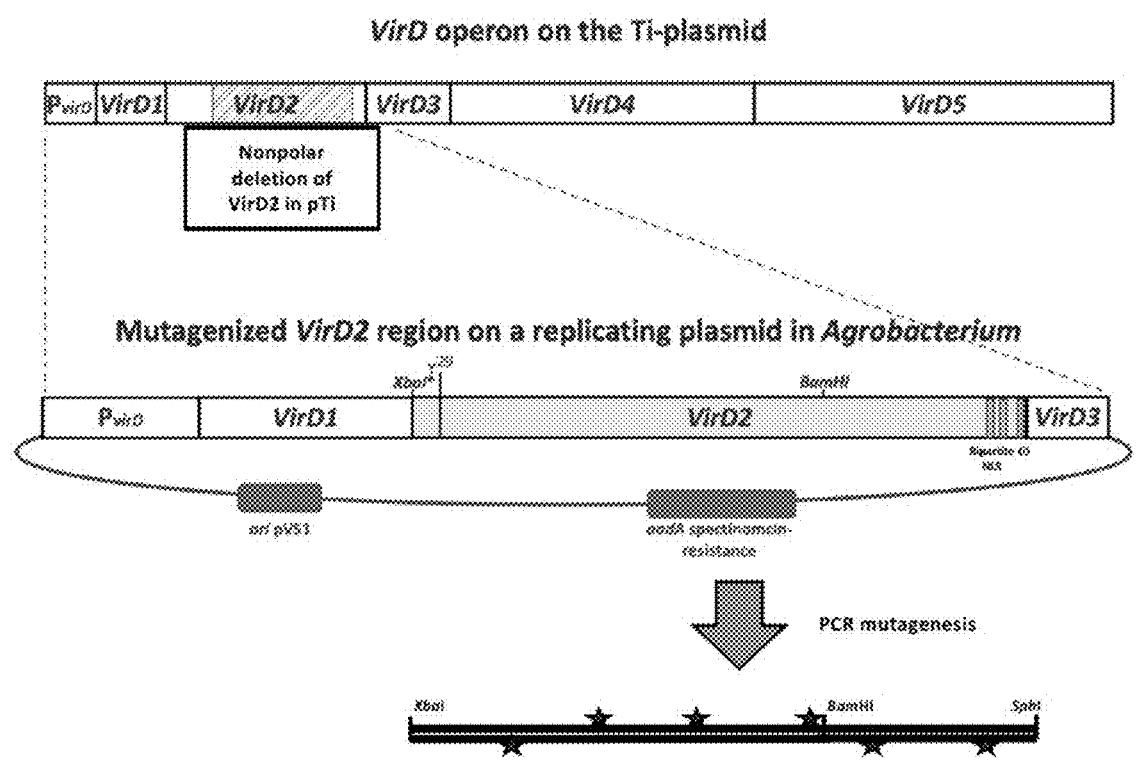
FIG. 3. Schematic diagram of the virD2 mutagenesis process. Upper map, map of the virD operon, showing the various virD genes and the non-polar deletion in virD2. Middle map, blow-up of the VirD$_{promoter}$-virD1-virD2 gene region. Lower map, schematic showing various random mutations that have been generated in virD2 by PCR mutagenesis.

The present disclosure provides that by mutating a VirD2 gene and VirD2 protein, one can generate an *Agrobacterium* strain that can transfer but not integrate T-DNA. The process of generating such *Agrobacterium* strains is illustrated in FIG. 3 and the detailed descriptions of each step are provided as follows:

Step 1: Make an *Agrobacterium* strain containing a deletion of VirD2 that is non-polar (i.e., does not affect expression) on the downstream genes VirD3, VirD4, and VirD5. In this particular embodiment, a non-polar VirD2 mutation in the tumorigenic Ti-plasmid pTiA6 was obtained from Dr. Walt Ream; construction of this strain is described in Shurvinton, C. E., et al. (Proc. Natl. Acad. Sci., USA 89: 11837-11841, 1992), that also indicates that nuclear localization signal and the C-terminal omega sequence in the *Agrobacterium tumefaciens* VirD2 endonuclease are important for tumor formation. A non-polar VirD2 mutation in the Ti-plasmid pTiEHA105 (in the *Agrobacterium* strain EHA105) was generated accordingly in the following way:

1. a 7.2 kbp XhoI fragment containing the entire agropine/succinamopine-type pTiBo542 virD operon from pE702 (the cosmid pEHC13) was subcloned into the XhoI site of pBluescript ks+ to make pE3332;

2. a 3.27 kbp Klenow-blunted SphI-XhoI fragment from pE3332 was subcloned into the SmaI-XhoI site of pE3351 (an Asp718 site filled pBluescript ks+) to make pE3353;

3. a 914 bp HindIII fragment from pE3052 (internal fragment of an octopine-type virD2 gene from pTiA6) was subcloned into a HindIII fragment deletion of pE3353 to make pE3355;

4. a 885 bp KpnI fragment (internal to the HindIII sites) from pE3355 was deleted to make pE3356;

5. an XhoI-NotI fragment (containing PvirD-virD1 partial VirD2 and VirD4) was also removed from pE3356 into pJQ200sk (a suicide plasmid, pE1416) to make pE3358; and 6. the above virD2 deletion operon (on pE3358) was recombined with the disarmed pTiBo542 (pTiEHA105) in *Agrobacterium* (using sacB counter-selection.

Step 2: Clone the VirD$_{promoter}$VirD1-VirD2 genes onto a plasmid that can replicate in both *E. coli* and *Agrobacterium*. This was done by cloning an EcoRI-SphI fragment containing the VirD$_{promoter}$ VirD1-VirD2 genes into pE4533, a plasmid containing a pVS1 origin of replication and the spectinomycin resistance gene AadA on the plasmid backbone. For some experiments, an XbaI site was added between sequences encoding the VirD1 stop codon and the VirD2 start codon. This was accomplished using PCR and the primers 5'-GACCATGATTACGAATCGAGC-3' (SEQ ID NO: 4) and 5'-AATTTCTAGAGGGCACCTTT-CAATAGCGAGC-3' (SEQ ID NO: 5) to amplify the ProD-virD1 region of pWR160, adding an XbaI site in the VirD1-VirD2 intergenic region. The primer 5'-AATTTCTA-GACTTGACCACGCACCTGACG-3' (SEQ ID NO: 6) was then combined with the primer 5'-ATACGCG-GATCCGTGCGTCGGC-3' (SEQ ID NO: 7) to add, using PCR, the region of VirD2 upstream of the BamHI site to the ProD-virD1 region upstream, including then newly added XbaI site.

Step 3: Conduct PCR-based random mutagenesis of the virD2 gene from Step 2. This was done by using an expired OneTaq DNA polymerase (OneTaq® DNA Polymerase—New England Biolabs®). Primer 195 (5'-AATTTCTA-GACTTGACCACGCACCTGACG-3' (SEQ ID NO: 6)) was used in combination with Primer 196 (5'-ATACGCG-GATCCGTGCGTCGGC-3' (SEQ ID NO: 7)) to mutagenize the region of VirD2 upstream of the BamHI site. Primer 185 (5'-TTAAGTTGGGTAACGCCAGGG-3' (SEQ ID NO: 8)) and Primer 186 (5'-AACAACCGCTTGAACAGCAC-3' (SEQ ID NO: 9)) were used to mutagenize the C-terminal region of VirD2, downstream of the BamHI site.

Step 4: Sequence the various mutants to determine where mutations have occurred (FIG. 4). Sanger sequencing was conducted at the Purdue University Genomics Center and the Noble Foundation using the sequencing primer 5'-AAT-TTCTAGACTTGACCACGCACCTGACG-3' (SEQ ID NO: 6), which flanks the 5' end of VirD2, and 5'-ATTG-CATGCATTGGACAGTGCAGAGCTAG-3' (SEQ ID NO: 10), which (in reverse orientation) flanks the 3' end of VirD2. Another primer, 5'-GAAGTCTCAATCCCGAAATGC-3' (SEQ ID NO: 11), was used to sequence the mid-section of VirD2 upstream of the BamHI site.

Figure 5:
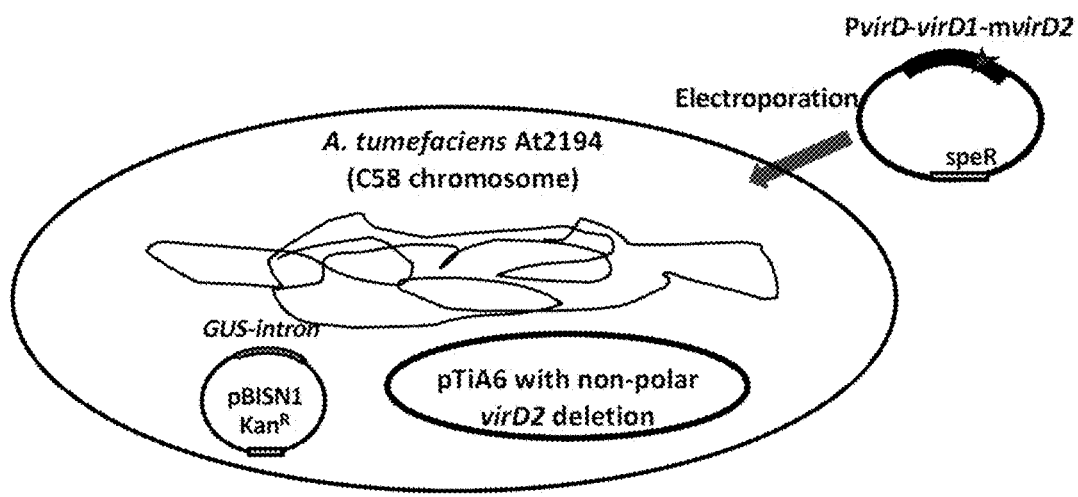
FIG. 5. Schematic diagram of building the *Agrobacterium* strains containing mutant virD2 genes. A plasmid containing the VirD$_{promoter}$-VirD1-virD2$_{mutant}$ is introduced into an *Agrobacterium* strain containing a Ti-plasmid with a non-polar deletion in virD2. This figure shows that the bacterium also contains the T-DNA binary vector pBISN1, but any compatible binary vector can be used. pBISN1 contains in its T-DNA a gusA-intron gene (to monitor transient transformation by GUS activity) and a Pnos-nptII gene (to monitor stable transformation by kanamycin resistance). The strain pictured also contains T-DNA that contains oncogenes such that the bacterium can incite tumors (stable transformation).

Step 5: After missense mutations in virD2, that change the amino acid sequence, were identified, plasmids containing these mutant virD2 genes were individually introduced by electroporation into the non-polar virD2 mutant *Agrobacterium* strains (these non-polar virD2 mutations were built into a tumorigenic octopine-type strain, and into the disarmed strain *A. tumefaciens* EHA105). Each of the plasmids containing a mutant virD2 gene was individually introduced into these strains, along with appropriate T-DNA binary vectors to monitor transient and stable transformation (FIG. 5).

Figure 6:
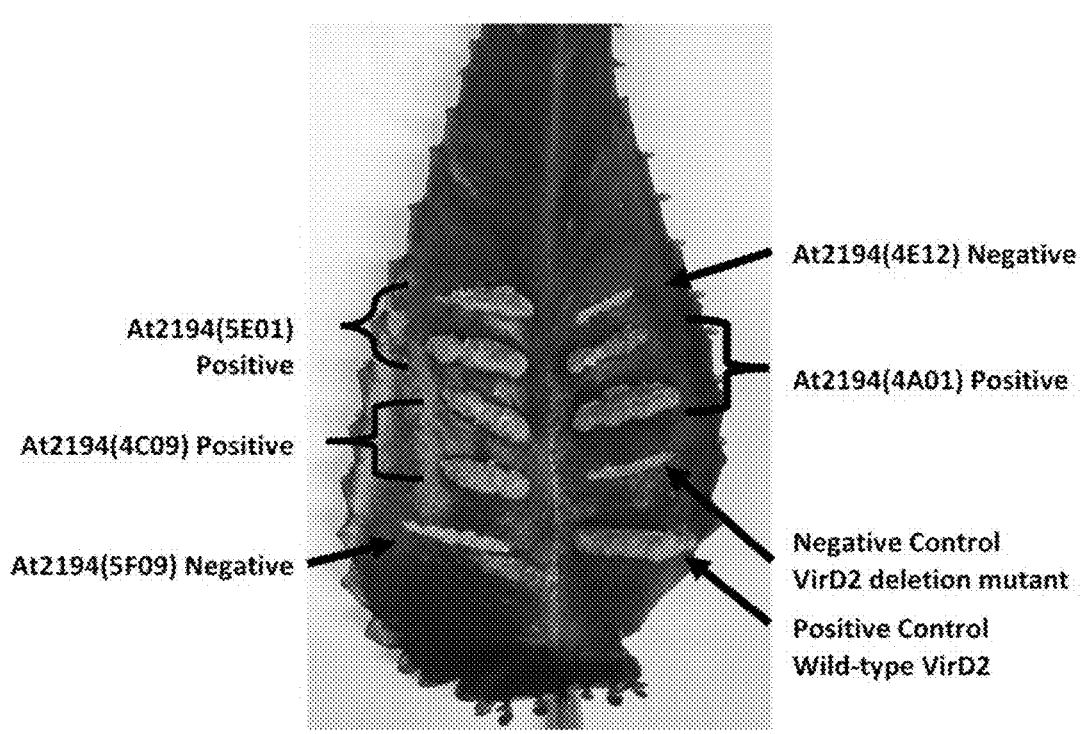
FIG. 6. *Kalanchoe* leaf inoculation. Leaves of *Kalanchoe diagremontiana* were wounded and each wound inoculated with a different *Agrobacterium* strain. After one month, the presence of tumors was scored. Note the positive (tumor) and negative (no tumor) controls. Of interest are virD2 mutant strains 5F09 and 4E12. These strains did not incite tumors, indicating a large decrease in stable transformation.

Step 6: The various *Agrobacterium* strains were used to inoculate wounded leaves of *Kalanchoe diagremontiana*. After one month, the wounds were scored for the formation of crown gall tumors (FIG. 6). This was accomplished as follows: Leaves of *Kalanchoe diagremontiana* approximately 10 cm long were surface sterilized with 70% ethanol. After the ethanol dried, sterile toothpicks were used to score the top epidermis of the leaf, not extending the wound through the entire leaf. As separate sterile toothpick was used to scrape each *Agrobacterium* strain from the agar surface of a petri dish containing YEP medium, and the resulting bacterial paste was applied to the wound (one strain per each wound). After 24 hr under low light in the laboratory, the plants were returned to a plant growth chamber to await tumor development.

Figure 7:
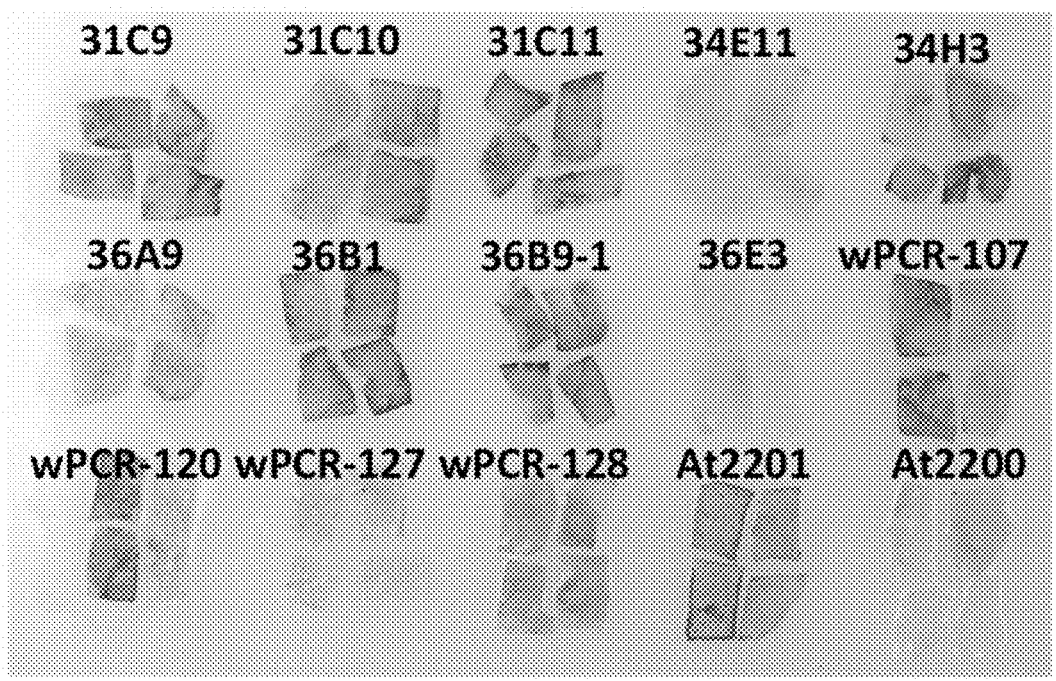
FIG. 7. X-gluc staining of tobacco leaves infiltrated with various virD2 mutant *Agrobacterium* strains. Tobacco leaves were infiltrated with various *Agrobacterium* strains and leaf sections from the infiltrated area were stained with X-gluc after 24 hr. At2201 is a positive control (wild-type virD2) and At2200 is a negative control (no virD2). Note that many virD2 mutant strains appear to transiently transform tobacco as well as does the wild-type virD2 strain.

Step 7. virD2 mutant *Agrobacterium* strains that did not incite tumors were tested for their ability to carry out transient transformation using a tobacco leaf infiltration assay. Because these bacteria contain the T-DNA binary vector pBISN1, successful transient transformation would generate GUS activity (as assayed by blue X-gluc staining). The results from some strains are shown in FIG. 7. Tobacco leaf infiltration was conducted as follows:

a) Separately grow the various *Agrobacterium* strains overnight at 30° C. with shaking in 50 ml YEP-medium plus the requisite antibiotics to maintain plasmids (kanamycin 50 mg/L and/or spectinomycin 100 mg/L);

b) measure A600 of the overnight culture on the next day;

c) Take out 2 ml cells, centrifuge, and resuspend the pellet into 2 ml of agroinfiltration buffer (10 mM MgCl$_2$, 10 mM MES buffer, pH 5.5-5.6) plus 200 mM acetosyringone to make the Aeoo=0.4-0.8. Keep the cells at room temperature for 2 hours;

d) Use a 1 ml syringe to infiltrate the underside of tobacco leaves;

e) On the following day, and on subsequent days, cut the infiltrated leaf region and place the tissue into a 1.5 ml microfuge tube. Add 0.5 ml of X-Gluc staining solution (50 mM NaPO$_4$, 10 mM EDTA, 0.1% Triton X-100, 1 mM X-gluc, pH 7.0) into the microcentrifuge tube; and f) Incubate overnight at 37° C.

Step 8: After identifying *Agrobacterium* strains that did not elicit tumors on *Kalanchoe* but still effected good transient transformation of tobacco leaves, additional, more quantitative transformation assays were conducted on *Arabidopsis* roots. GUS activity (% of root segments staining blue with X-gluc) was used to investigate transient transformation, and generation of kanamycin-resistant calli or tumor formation to investigate stable transformation. Transient and stable *Arabidopsis* root segment transformation was carried out as described in Tenea, G. N., et al. (Plant Cell 21(10): 3350-3367, 2009). Overexpression of several *Arabidopsis* histone genes increases *Agrobacterium*-mediated transformation and transgene expression in plants.

Briefly, wild-type (ecotype Col-0) *Arabidopsis* seeds were surface sterilized, washed five times in sterile water, and placed at 4° C. overnight. The seeds were then plated onto solidified B5 medium plus 100 mg/L Timentin and germinated for 10-14 days until the seedlings had true leaves. Seedlings were then transferred to baby food jars containing solidified B5 medium and grown for a further 10-14 days. Roots of these plants were cut into 2-5 mM segments and placed, in a pile, onto solidified MS medium. 50 µl of the various concentrations (105 cfu/ml-10$^8$ cfu/ml) of the different *Agrobacterium* strains were placed on the root segments, then the excess bacteria removed after 15 minutes. The plates were taped with plastic wrap and placed in a growth chamber (22° C.) for two days. For transient transformation, the root segments were moved as a pile to solidified CIM medium for 4 days, then stained for GUS activity as described above. For stable transformation, root segments were individually separated onto solidified MS medium plus 100 mg/L Timentin (for tumorigenesis assays) or solidified CIM medium plus 100 mg/L Timentin plus 100 mg/L kanamycin (for antibiotic resistance assays), the plates were taped with plastic wrap, and the plates incubated in a growth chamber (22° C.) for 4 weeks. Tumors, or kanamycin-resistant calli, were quantified using a low-power dissecting microscope.

Figure 8:
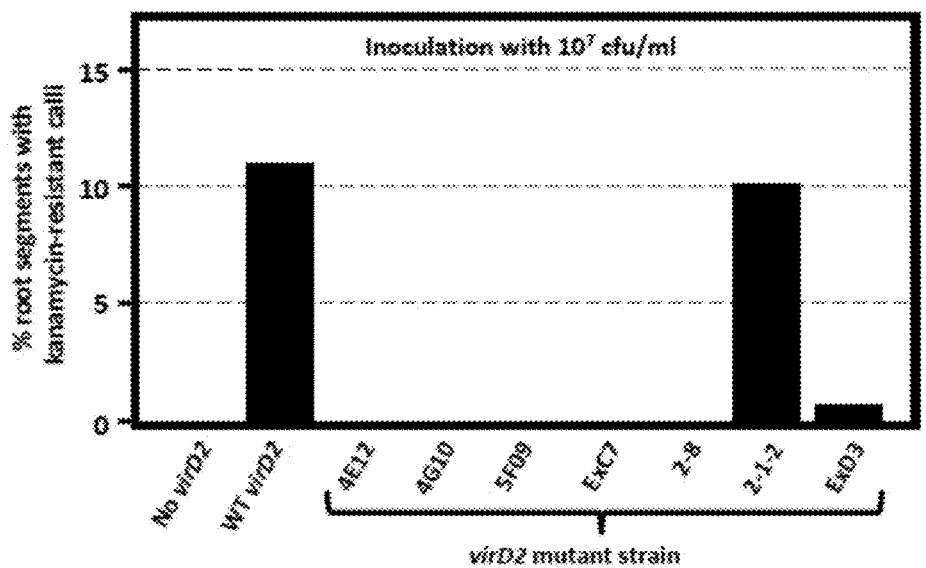
FIG. 8. Quantitative stable transformation assay of *Arabidopsis* root segments infected with *Agrobacterium* strains harboring various mutant virD2 genes. Root segments from wild-type (ecotype Col-0) plants were infected with the various *Agrobacterium* strains at 107 cfu/ml for two days.

FIG. 8 shows an example of results from a stable transformation assay. Only one (2-1-2) of the tested virD2 mutant strains was efficient at stable transformation. FIG. 9 shows an example of results from a transient transformation assay. Note that mutant 5F09 did not show transient (or stable; FIG. 8) transformation activity, so it likely just contains a "dead" VirD2 protein. Mutant 4E12 has substantial transient transformation activity, making it a candidate for a strain that has very low stable but substantial transient transformation activity.

Step 9: Test the various *Agrobacterium* strains, containing mutant virD2 genes and a T-DNA binary vector containing within the T-DNA region a Cas9 gene and a gene encoding guide RNAs, for their ability to effect genome editing by causing mutations near the Cas9 cleavage site in plant genomes. This was done by cloning the protospacer 5'-GCTGCATGGAAAGATGATGA-3' (SEQ ID NO: 12) (which targets the *Nictotina benthamiana* PDS1 and PDS2 genes) into the T-DNA region of the *Agrobacterium* strain At2331. At2331 is *A. tumefaciens* EHA105 with the non-polar virD2 mutation described above. It also contains the T-DNA binary vector pE4747, containing genes encoding Cas9, a Venus-NLS protein, a hptII hygromycin-resistance gene, and a sgRNA scaffold to express sgRNAs.

FIG. 10 shows examples of mutations caused by Cas9 cleavage in the *N. benthamiana* PDS2 gene and subsequent mis-repair of the double-strand DNA break.

It should be emphasized that the above descriptions of embodiments and/or special procedures/methods of the present disclosure are merely possible examples of implementations set forth for a clear understanding of the principles of the disclosure. Many variations and modifications may be made to the above-described embodiment(s) and/or procedures/methods without departing substantially from the spirit and principles of the disclosure. All such modifications and variations are intended to be included herein within the scope of this disclosure and protected by the following claims.

REFERENCES

Shurvinton, C. E., Hodges, L., and Ream, W. (1992). A nuclear localization signal and the C-terminal omega sequence in the *Agrobacterium tumefaciens* VirD2 endonuclease are important for tumor formation. Proc. Natl. Acad. Sci., USA 89: 11837-11841.

Tenea, G. N., Spantzel, J., Lee, L.-Y., Zhu, Y., Lin, K., Johnson, S. J., and Gelvin, S. B. (2009). Overexpression of several *Arabidopsis* histone genes increases *Agrobacterium*-mediated transformation and transgene expression in plants. Plant Cell 21: 3350-3367.

What is claimed is:

1. An *Agrobacterium* strain comprising a VirD2 gene mutant that effects efficient transient transformation of a plant cell, wherein said *Agrobacterium* strain has at least 5- to 50-fold less stable transformation than an Agrobacterium comprising a wild-type VirD2 amino acid sequence or no stable transformation, and said VirD2 gene mutant mutation results in an amino acid substitution of His$^{402}$ Arg in the amino acid sequence encoded by said VirD2 gene mutant; wherein transient transformation comprises transferring, but not integrating, T-DNA into a plant cell inoculated with the *Agrobacterium* strain; and wherein the mutant VirD2 gene of said strain further comprises a replacement of a final stop codon of the VirD2 gene mutant with a polynucleotide which encodes a polypeptide comprising the amino acid sequence of SEQ ID NO: 17.

* * * * *